United States Patent
Hovestadt et al.

(10) Patent No.: US 8,005,681 B2
(45) Date of Patent: Aug. 23, 2011

(54) SPEECH DIALOG CONTROL MODULE

(75) Inventors: Guido Hovestadt, Wickede (DE);
Stefan Wolf, Schwieberdingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 969 days.

(21) Appl. No.: 11/858,383

(22) Filed: Sep. 20, 2007

(65) Prior Publication Data

US 2008/0140422 A1   Jun. 12, 2008

(30) Foreign Application Priority Data

Sep. 22, 2006  (EP) .................................... 06019880

(51) Int. Cl.
*G10L 21/00* (2006.01)
*G06F 17/28* (2006.01)
(52) U.S. Cl. ............. 704/275; 704/2; 704/270; 704/277
(58) Field of Classification Search .................. None
See application file for complete search history.

(56) References Cited

U.S. PATENT DOCUMENTS

| | | | |
|---|---|---|---|
| 6,377,913 B1 * | 4/2002 | Coffman et al. | 704/8 |
| 6,539,358 B1 | 3/2003 | Coon et al. | |
| 6,999,932 B1 * | 2/2006 | Zhou | 704/277 |
| 7,236,922 B2 * | 6/2007 | Honda et al. | 704/2 |
| 7,386,437 B2 * | 6/2008 | Brulle-Drews | 704/3 |
| 2006/0136220 A1 * | 6/2006 | Gurram et al. | 704/275 |
| 2007/0050191 A1 * | 3/2007 | Weider et al. | 704/275 |

FOREIGN PATENT DOCUMENTS

EP            1 699 042 A1     9/2006

* cited by examiner

*Primary Examiner* — Matthew Sked
(74) *Attorney, Agent, or Firm* — Brinks Hofer Gilson & Lione

(57) ABSTRACT

A speech dialog control module enhances user operation of a speech dialog system by translating an input signal unrecognizable by a speech dialog system into a recognizable language. A speech dialog control module includes an input device that receives a speech signal in a first language. A controller receives the input signal and generates a control instruction that corresponds to the received input signal. The control instruction has a language that is different from the input signal. A speech-synthesis unit converts the control instruction into an output speech signal. An output device outputs the output speech signal.

18 Claims, 6 Drawing Sheets

SPEECH DIALOG CONTROL MODULE

PRIORITY CLAIM

This application claims the benefit of priority from European Patent Application No. 06019880.1, filed Sep. 22, 2006, which is incorporated by reference.

BACKGROUND OF THE INVENTION

1. Technical Field

This application relates to speech dialog systems and, more particularly, to a speech dialog control module.

2. Related Art

A speech dialog system receives speech signals and may recognize various words or commands. The system may engage a user in a dialog to elicit information to perform a task or control a device. Occasionally, the user is unable to provide the speech dialog system with an appropriate input. In some instances this is because the speech dialog system is configured to receive inputs in a language that is different than the one spoken by a user. In other situations, the user is unaware of the commands recognized by the speech dialog system.

SUMMARY

A speech dialog control module enhances user operation of a speech dialog system by translating an input signal unrecognizable by a speech dialog system into a recognizable language. A speech dialog control module includes an input device that receives a speech signal in a first language. A controller receives the input signal and generates a control instruction that corresponds to the received input signal. The control instruction has a language that is different from the input signal. A speech-synthesis unit converts the control instruction into an output speech signal. An output device outputs the output speech signal.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

This technology may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A speech dialog control module enhances the operation of a speech dialog system by converting a received input signal into a language that is recognizable by a speech dialog system. A speech dialog control module receives an input signal at an input device. A processor processes the received input signal and generates a control instruction that represents the input signal. A speech-synthesis unit converts the control instruction into an output speech signal that has a language that is different from the input signal and that is recognizable by a speech dialog system. An output device outputs the output speech signal to a speech dialog system.

Figure 1:
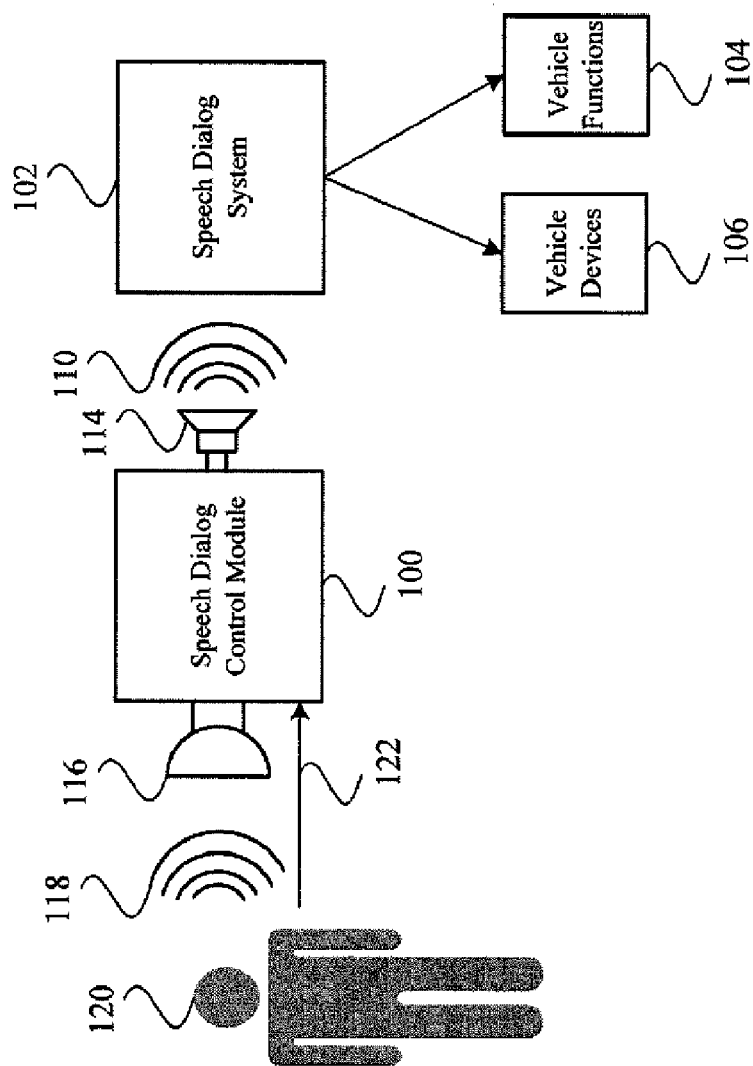
FIG. 1 is a block diagram of a speech dialog control module for use within a device that transports persons and/or things.

FIG. 1 is a block diagram of a speech dialog control module 100 that may be used within a device that transports persons and/or things, such as a vehicle. A speech dialog control module 100 may receive at an input device 116 an input signal in a language that is unrecognizable by speech dialog system 102. The input signal may comprise a speech signal 118 from a user 120 or a non-audio signal 122. The non-audio input signal 122 may be a user supplied input, such as an input generated by a haptic device which may include a touchpad, push-to-talk button or lever, or keypad device. Alternatively, the non-audio input signal 122 may be a signal generated by a device in communication with the speech dialog control module 100, such as an electronic signal generated by an on-board computer, positioning system, vehicle sensor, or other vehicle device.

The input device 116 may comprise a device or sensor that converts the received input signal (118, 122) into an analog or digital data. After receiving the input signal (118, 122), the speech dialog control module 100 converts the input signal (118, 122) into a control instruction that corresponds to the input signal but in a language that will be recognizable by the speech dialog system 102. The control instruction is converted into an output speech signal that is output through an output device 114.

The output of the output device 114 may be an acoustic signal 110 that is received as input to the speech dialog system 102. The speech dialog system 102 receives and processes the acoustic signal 110 and uses this information to control components and/or functions of the vehicle. In response to the acoustic signal 110, the speech dialog system 102 may control various vehicle components/functions, such as a fan, turn signal, windshield wipers, climate control system, windows, headlights, interior lights, or other vehicle functions shown as 104 in FIG. 1. Alternatively, the speech dialog system 102 may control vehicle devices 106, such as a radio, a telephone, a navigation system, a compact disc (CD) player, a digital versatile disc (DVD) player, a compact cassette (CC) player, an infotainment system, an on-board computer, or other vehicle device.

Figure 2:
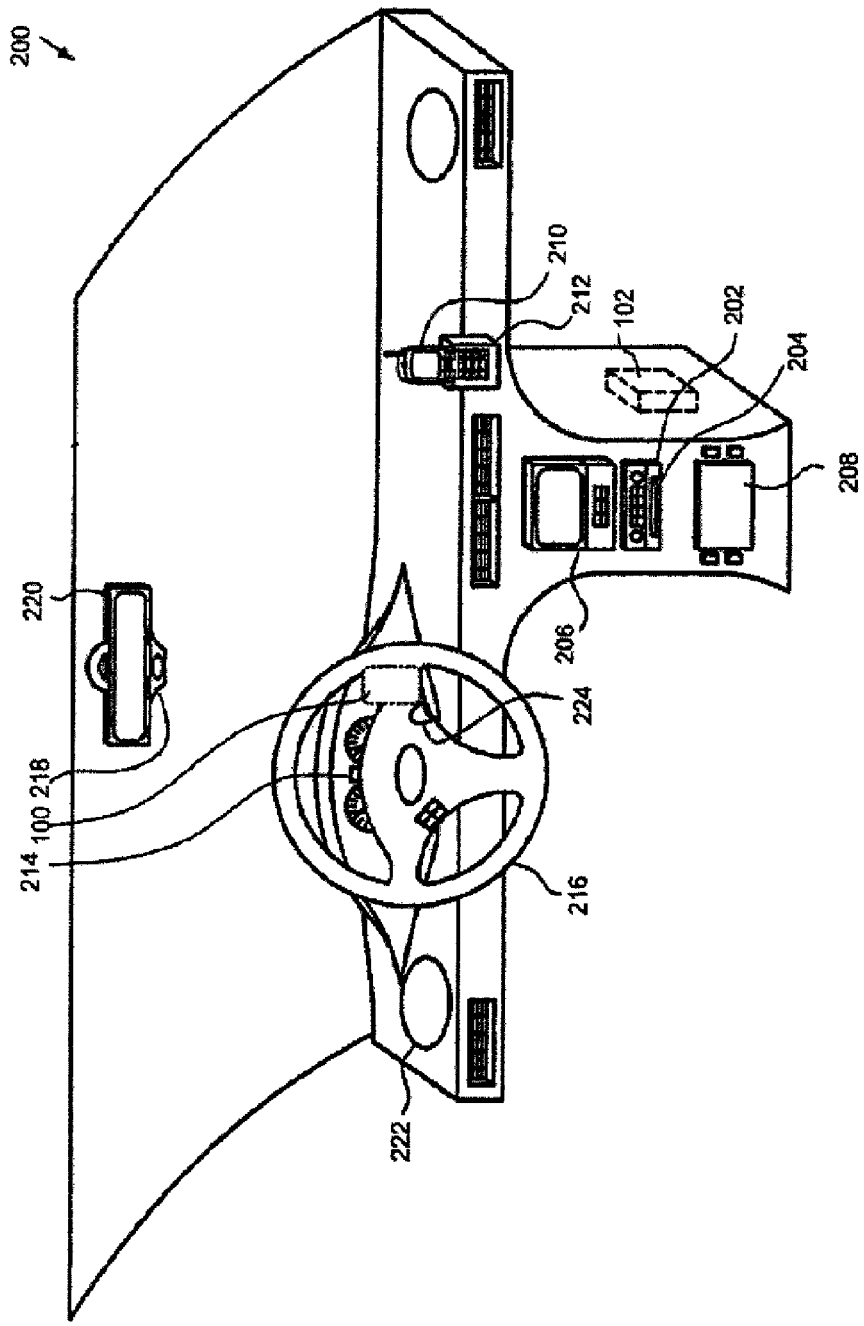
FIG. 2 is a speech dialog control module within a vehicle.

FIG. 2 is an illustration of a speech dialog control module 100 within a vehicle 200. In FIG. 2, the vehicle includes a radio 202 that includes a CD player 204, a navigation system 206, and a climate control 208. Additionally, the vehicle includes a telephone, which may be wired or wireless, and may be held by a telephone holder 212, an on-board computer 214, and a speech dialog system 102.

The speech dialog control module 100 may be part of a device that is separate from the vehicle and/or the speech dialog system 102. In FIG. 2, the speech dialog control module 100 is a separate device that is mounted to the vehicle steering wheel 216. A microphone 218 mounted in the rearview mirror is in communication with the speech dialog system 102 and receives the acoustic signals 110 from the speech dialog control module 100.

In some applications, the speech dialog control module 100 may be activated through a haptic command, a spoken phrase or keyword, or automatically by another vehicle device. Once activated, the speech dialog control module 100 receives an input signal in a language that is different from a speech dialog system 102 recognizable language. For example, in the case where the speech dialog system 102 is configured to recognize English vocabulary, and the user only speaks German, the user may speak the German phrase "Scheibenwischer AN." The speech dialog control module 100 receives the German speech at the input device, processes the input signal to convert it to a command instruction in a recognizable language (e.g., English), and outputs a corresponding acoustic signal. The acoustic signal may be output through a speech dialog control module loudspeaker as the English phrase "windshield wiper on" The speech dialog system 100 may receive this command through microphone 218 and generate a command to switch on the vehicle's windshield wipers.

In other applications, the speech dialog control module 100 may be activated by another vehicle device. This may be useful when a user that is unfamiliar with the commands or language that is recognizable by the speech dialog system 102. For example, when the vehicle includes a navigation unit 206 the navigation unit 206 may initiate operation of the speech dialog control module 100. In one instance, the navigation unit 206 may sense that the vehicle is approaching a particular geographic location and generate an input signal that is received at the speech dialog control module 100. The speech dialog control module 100 may process this input signal and generate an acoustic signal that is received by the speech dialog system 102. One or more vehicle components and/or functions may be controlled in response to this acoustic signal. In For example, if the vehicle was approaching a tunnel, the navigation unit 206 may generate and input signal that has the function of closing the vehicle's air vent and starting the recirculation fan. The speech dialog control module 100 may receive this input signal and output an output acoustic signal such as "recirculation fan on." A speech dialog system 102 receiving this acoustic signal may turn on the vehicle fan and close the air vent. Upon exiting the tunnel, the navigation unit 206 may cause the speech dialog control module 102 to output an acoustic signal "supply air." In response to this acoustic signal, the speech dialog system 102 may cause stop the vehicle fan and reopen the vehicle's air vents. In other applications, when the navigation unit 206 senses the vehicle has approached a particular location, the navigation unit 206 may generate an input signal that has the function to call a particular individual or business. In response to this input signal, the speech dialog control module 100 may generate an output acoustic signal that comprises a telephone number or telephone contact, such as "dial 555 555 5555," or "call John."

In FIG. 2, a push-to-talk button 224 that operates the speech dialog system 102 is positioned on the steering wheel 216. In some instances, before the speech dialog system 102 processes an acoustic signal the push-to-talk button 224 must first be actuated.

Figure 3:
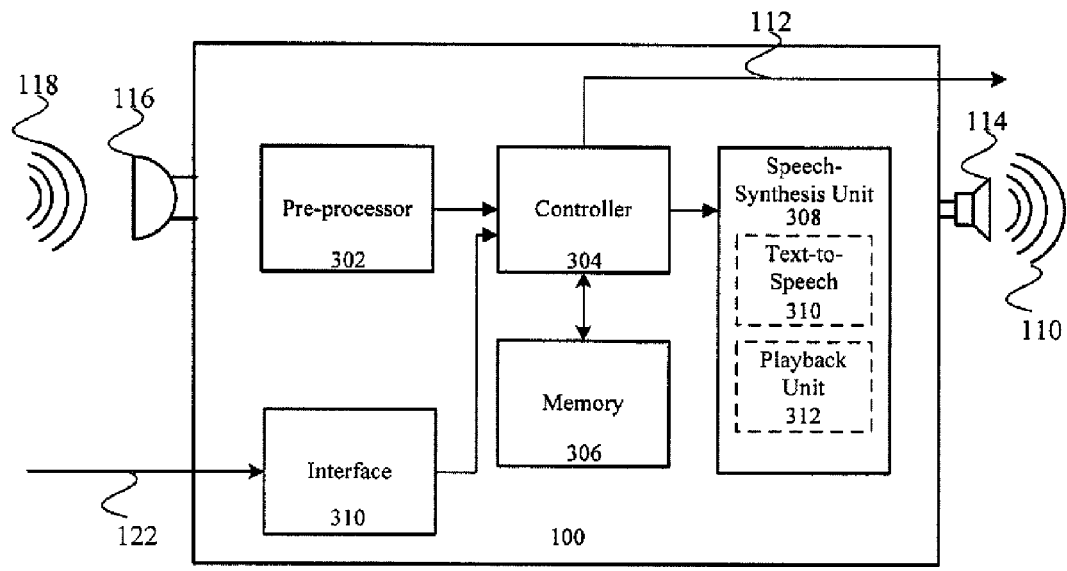
FIG. 3 is a block diagram of a speech dialog control module.

FIG. 3 is a block diagram of a speech dialog control module 100. The speech dialog control module 100 includes an input device 116 that receives speech signals from a user. The input device 116 may be a device that converts audible signals into signals that vary over time and/or digital signals, such as a microphone. An interface 310 may receive non-audio signals, such as a signal from a haptic device or an electronic signal generated by another vehicle device. A pre-processor 302 may condition the signal received from the input device 116. In some applications, the received signal is conditioned by substantially removing or dampening a continuous noise that reduces the clarity of the speech signals. The pre-processor 302 may improve the clarity of the signal by using a signal and noise estimate and (1) generating a noise-reduced signal by neural network mapping the signal and the noise estimate, (2) subtracting the noise estimate from the signal, or (3) selecting a noise-reduced signal from a code-book based on the signal and noise estimate. In other applications, the pre-processor 302 increases or decreases the magnitude of the received signal. In yet other applications, the pre-processor 302 acts as a pass through filter reproducing the received signal in a substantially unchanged form.

The pre-processor 302 may also condition the signal received from the interface 310. In some applications, conditioning of this signal includes performing error checking and/or data extraction.

A controller 304 that executes conversion applications receives the signals output by the pre-processor 302, and in connection with a memory 306, processes these signal to identify a command in a first language and generate a control instruction that can be provided to the speech dialog system 102 in a different language. The first language may be a spoken language that is unrecognizable by the speech dialog system. Alternatively, when the command is received generated through the haptic input or by a vehicle device, the first language may be a machine language.

In some speech dialog control modules 100, the controller 304 identifies the command in the first language through a matching process. In other speech dialog control modules 100, the controller 304 analyzes the received signal and based on the context of the command identifies the first language command.

A speech-synthesis unit 308 receives the command instruction from the controller 304 and generates a second language speech signal. In some implementations, the speech-synthesis unit 308 comprises a text-to-speech processor 310. In other implementations, the speech-synthesis unit 308 comprises a playback unit 312 that couples with the memory 306 and accesses spoken signals pre-recorded in the second language. A device that converts electrical signals to audible signals, such as a loudspeaker 114, receives the output from the speech-synthesis unit and outputs acoustic signal 110.

Figure 4:
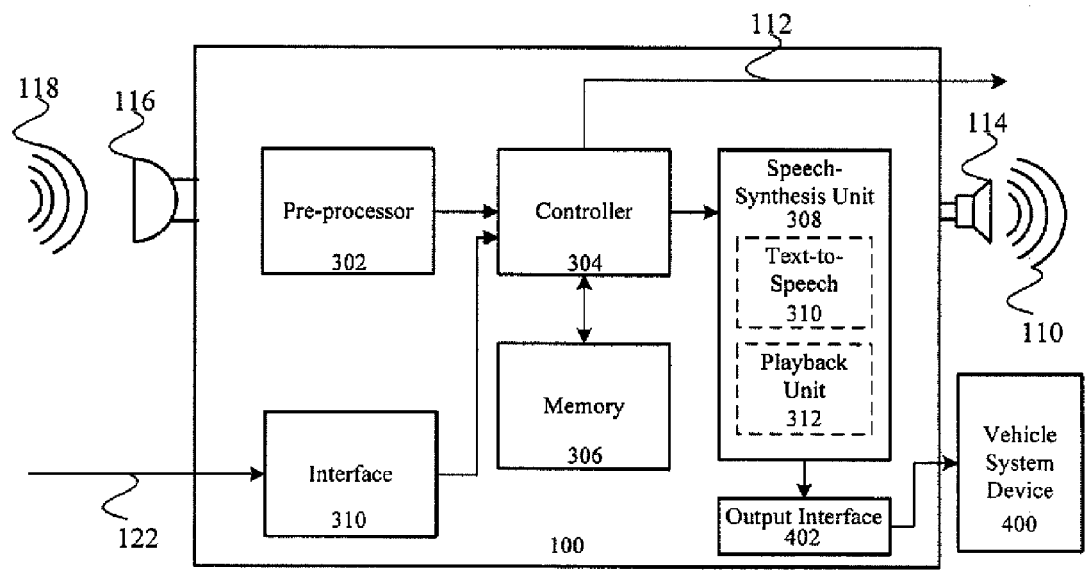
FIG. 4 is a block diagram of an alternate speech dialog control module.

FIG. 4 is a block diagram of a second alternate speech dialog control module 100. In FIG. 4, the speech dialog control module 100 may use a vehicle system device 400 to output the acoustic signals 110 to the speech dialog system 102. In some applications, this device may be a loudspeaker of a vehicle audio or audio/video system. Data may be transmitted from the speech dialog control module 100 to the vehicle system device 400 through an output interface 402. The output interface 402 may couple to the vehicle system device 400 through a hardwired connection or a wireless connection and may route through other intermediate devices, such as a transmitter, a receiver, an on-board computer, an electronic control unit, an electronic control module, or a body control module, or other vehicle device interface. A list of transmission protocols may be retained in memory 306. Selection of a particular transmission protocol may be implementation dependent and may be controller by controller 304 or through a user provided input. Some transmission protocols may include Radio Frequency ("RF"), Infrared ("IR"), Bluetooth®, CAN, High Speed CAN, MOST, LIN, IDB-1394, IDB-C, D2B, J1850VPW, J1850PWM, ISO, ISO91410102, or ISO14230.

Figure 5:
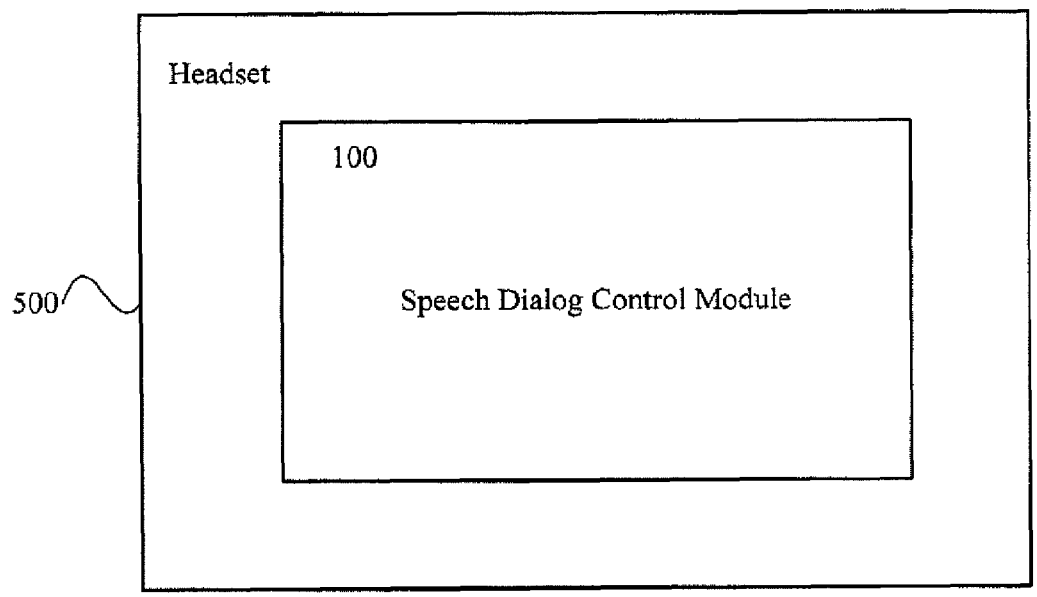
FIG. 5 is a block diagram of a second alternate speech dialog control module.
Figure 6:
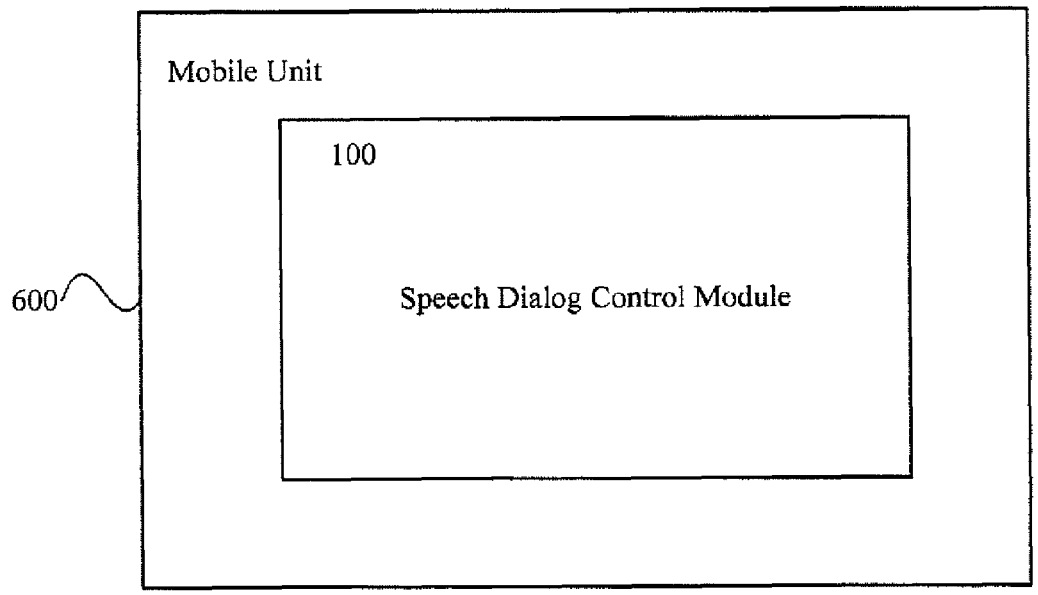
FIG. 6 is a block diagram of a third alternate speech dialog control module.

FIG. 5 is a block diagram of a second alternate speech dialog control module 100. In some implementations the speech dialog control module 100 is part of a hands-free communication device that is supported near a user's head, such as the headset 500 of FIG. 5. When installed within a headset 500, the speech dialog control module 100 may transmit command instructions to a vehicle device 400 through a hardwired or wireless transmission protocol. The vehicle device 400 may receive data from the speech dialog control module 100 and output an acoustic signal 110 that is received and recognizable by the speech dialog system 102. FIG. 6 is a block diagram of a third alternate speech dialog control module 100 that is part of a mobile unit 600, such as a personal digital assistant (PDA) or a telephone. The mobile unit 600 may retain calendar or appointment data and/or contact data (e.g., phone numbers, email address, street address, and/or name/nickname data) that may be used in conjunction with one or more other vehicle components to provide an input signal to the speech dialog control module 100. This input signal may be used to contact individuals or entities associated with this information of may alternatively be used as an input to store additional information provided through a user's spoken commands. In some applications, the calendar and/or contact data may alternatively be stored in memory 306.

Figure 7:
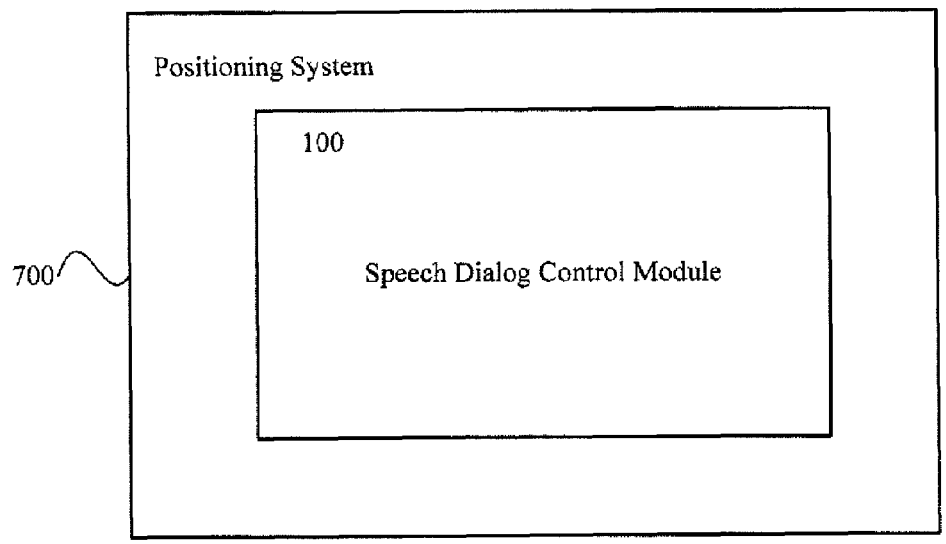
FIG. 7 is a block diagram of a forth alternate speech dialog control module.

FIG. 7 is a block diagram of a fort alternate speech dialog control module 100 that is coupled with a positioning system 700, such as the navigation system or global positioning system (GPS) of FIG. 7. The positioning system 700 may include hardware and/or software that processes position data received from one or more external sources and determines an approximate geographical position of the vehicle. The geographical position of the vehicle may be cross-referenced with an in-vehicle or external database that stores nationwide, citywide, or municipal road and/or climate data. When the vehicle is in a particular geographic location, the speech dialog control module 100 may receive a non-audio input signal from the positioning system 700 that is in a language unrecognizable by the speech dialog system 102. In response to the non-audio input signal, the speech dialog control module 100 may output through a vehicle device 500 or a loudspeaker 114 an acoustic output signal in a language that is recognizable by the speech dialog system 102. The positioning system 700 and the speech dialog control module 100 may communicate through one or more wired or wireless protocols.

Figure 8:
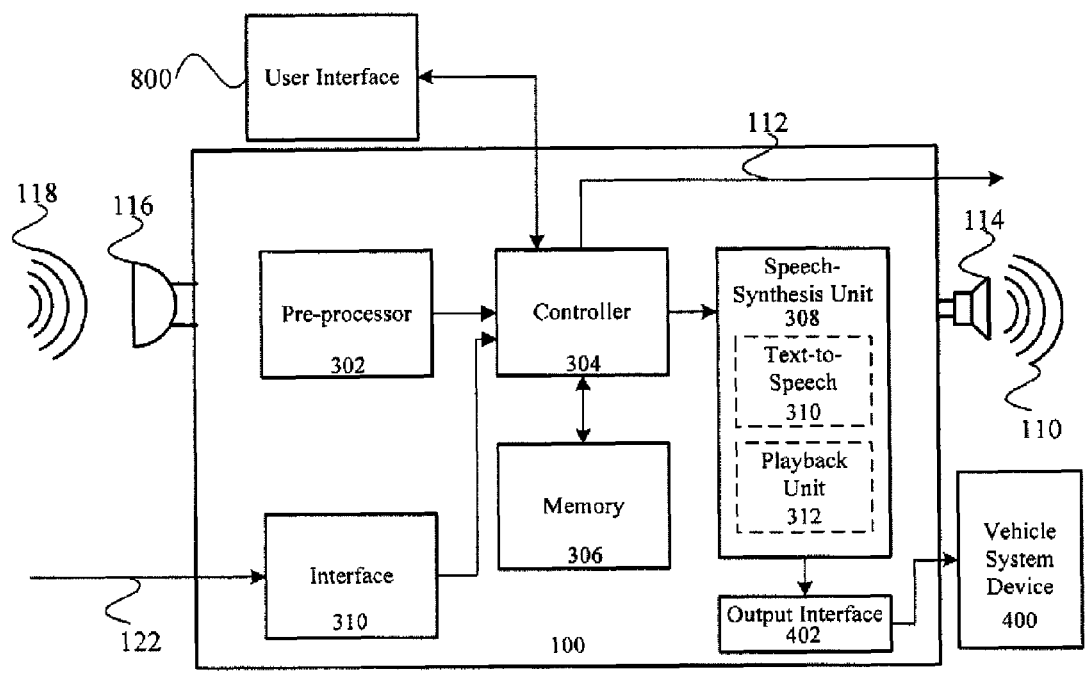
FIG. 8 is a block diagram of a fifth alternate speech dialog control module.

A user interface 800, as shown in FIG. 8, facilitates user interaction with the speech dialog control module 100. The user interface 800 may allow a user to choose a one or more customizable profiles. A first profile may be a language profile that is stored in memory 306 and may be used to identify the language of input signal. A second profile may be a vehicle profile which may also be stored in memory 306 and may be used to select the language of the acoustic output signal. In some applications, the vehicle profile may also be used to configure whether the speech dialog control module 100 should receive/respond to non-audio input signals. In other applications, the vehicle profile may be used to configure the form of the output (e.g., text-to-speech or prerecorded spoken language) and/or the output system used to provide the acoustic output signals (e.g., a loudspeaker coupled with the speech dialog control module 100, a vehicle audio system, a hands-free loudspeaker, or another device that generates an acoustic output signal). The user interface 800 may include an input and/or output device. Input device may include push-button switches, selection keys, and/or a touchscreen. The output device may include a display device and/or an audio device.

Figure 9:
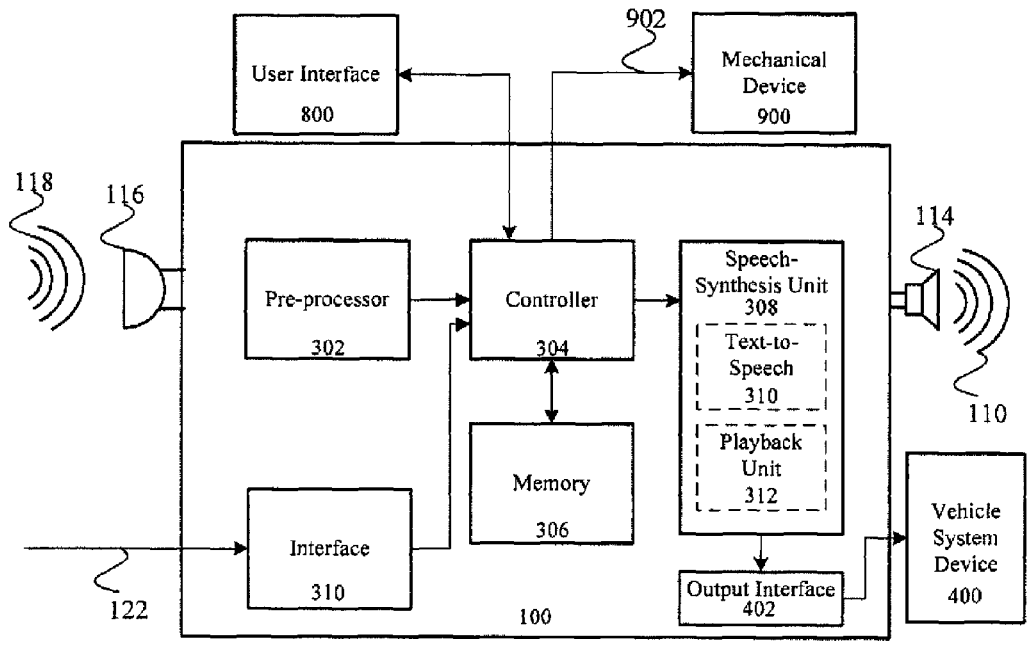
FIG. 9 is a block diagram of a sixth alternate speech dialog control module.

FIG. 9 is a block diagram of a sixth alternate speech dialog control module 100. In FIG. 9, a mechanical device 900 responds to a control signal 902 and may actuate a push-to-talk button (e.g., 224) or lever in order to activate the speech dialog system 102. The mechanical actuating device may be a lever, arm, or other mechanical device that can be operated in response to the control signal 902. In some applications, the mechanical device 900 may be constructed from multiple components. The control signal 902 may be generated by the controller 304 in response to a received input signal. In some applications, a user may provide a keyword before or as part of an input signal. In response to the keyword, the controller 304 may output the control signal 902 to activate the mechanical device 900 and in turn activate the speech dialog system 102 prior to outputting the output acoustic signal.

Figure 10:
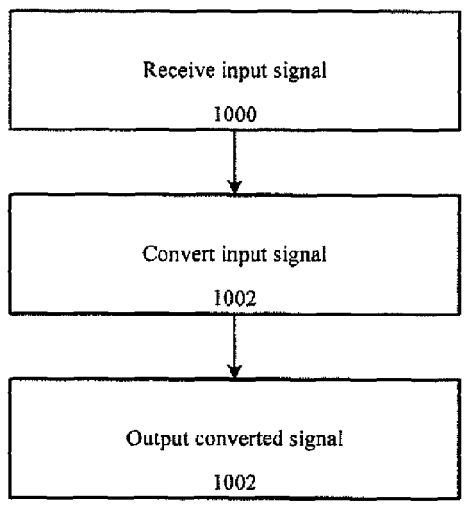
FIG. 10 is flow diagram of a method of controlling a speech dialog system.

FIG. 10 is a method of controlling a speech dialog system. At act 1000 an input signal in a language that is unrecognizable by a speech dialog system is received by the speech dialog control module. The input signal may be a signal received from a user or from a vehicle device. User supplied input signals may include speech signals or signals input through a haptic device. Input signals received from a vehicle device may be automatically generated. In some applications, the vehicle device automatically generates an input signal in real-time or after a delay when a predetermined or user customizable condition occurs, such a being in a particular geographical location.

At act 1002 the speech dialog control module converts the input signal to a control instruction in a language that is recognizable by the speech dialog control module. At act 1004, the control instruction in a language that is recognizable by the speech dialog control system is output to the speech dialog system. In some applications, the control instruction in the recognizable language is transmitted through a loudspeaker that is in communication with the speech dialog control module. The output of the loudspeaker is an acoustic signal that may be received and processed by the speech dialog system. In other applications, the control instruction in the recognizable language is output through a vehicle system device, such as a vehicle's audio system's loudspeakers or another audio or audio/visual device. The signal output by the vehicle system device may be an acoustic signal that is received by the speech dialog system. In instances where it is required to actuate a push-to-talk button of a speech dialog system before it can receive a speech input signal, the speech dialog control module may cause a mechanical device to actuate the push-to-talk button before outputting an output acoustic signal.

In some instances, the speech dialog control module described in FIGS. 1-10 may execute a pre-programmed or user customizable series of commands (e.g., macros) in response to a user provided keyword or a single haptic input. For example, in response to a keyword input, the speech dialog control module may output the appropriate output acoustic signals in order to complete the setup of a user's headset. In other situations, a keyword input may execute other combinations of commands such that a user need not provide each individual input signal.

Each of the processes described may be encoded in a computer readable medium such as a memory, programmed within a device such as one or more integrated circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Although selected aspects, features, or components of the implementations are described as being stored in memories, all or part of the systems, including processes and/or instructions for performing processes, consistent with the system may be stored on, distributed across, or read from other machine-readable media, for example, secondary storage devices such as hard disks, floppy disks, and CD-ROMs; a signal received from a network; or other forms of ROM or RAM resident to a processor or a controller.

Specific components of a system may include additional or different components. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions), databases, and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A speech dialog control module, comprising:
   an input device that receives an input signal in a first language;
   a controller that receives the input signal and generates a control instruction that correlates to the input signal and that has a language that is different from the input signal;
   a speech-synthesis unit that converts the control instruction into an output speech signal; and
   an output device that outputs the output speech signal, the output device comprising a mechanical actuating unit that is configured to actuate a push button of a speech dialog system.

2. The speech dialog control module of claim 1, where the input signal is a speech signal.

3. The speech dialog control module of claim 2, where the input device comprises a speech detecting unit.

4. The speech dialog control module of claim 1, where the speech synthesis unit comprises a text-to-speech unit.

5. The speech dialog control module of claim 1, where the speech synthesis unit comprises a playback unit that generates the output speech signal from pre-recorded speech signals.

6. The speech dialog control module of claim 1, where the input device further comprises a haptic device.

7. The speech dialog control module of claim 1, further comprising a memory that stores language profile data.

8. The speech dialog control module of claim 1, further comprising a memory that stores vehicle profile data.

9. The speech dialog control module of claim 1, further comprising a positioning system that automatically generates the input signal in response to a detected position.

10. The speech dialog control module of claim 1, where the output device further comprises a vehicle audio system.

11. A method of controlling a speech dialog system, comprising:
    receiving, with at least one processor, an input signal in a first language;
    converting, with the at least one processor, the input signal into a control instruction that corresponds to the input signal and that has a language that is different from the input signal;
    outputting, with the at least one processor, an output acoustic signal; and
    actuating mechanically a push-to-talk button of the speech dialog system before outputting output acoustic signal.

12. The method of claim 11, where the output acoustic signal is generated by a text-to-speech conversion.

13. The method of claim 11, where the output acoustic signal is generated by playing back pre-recorded speech.

14. The method of claim 11, further comprising storing language profile data in a memory.

15. The method of claim 11, further comprising storing vehicle profile data in a memory.

16. The method of claim 11, further comprising outputting the output acoustic signal through a vehicle audio system.

17. The method of claim 11, where the input signal is a speech signal.

18. The method of claim 11, where the input signal is a machine language signal.

* * * * *